United States Patent [19]
Danzo et al.

[11] Patent Number: 5,683,132
[45] Date of Patent: Nov. 4, 1997

[54] SPORT UTILITY VEHICLE CARGO AREA LINER

[76] Inventors: John Danzo, 8121 Eaton Hwy., Grand Ledge, Mich. 48837; Laurence G. Feiler, III, 540 Juneberry La., Okemos, Mich. 48864

[21] Appl. No.: 621,687

[22] Filed: Mar. 26, 1996

[51] Int. Cl.$^6$ .......................... B62D 25/00; B62D 33/06
[52] U.S. Cl. ...................... 296/37.6; 296/37.16; 296/39.2
[58] Field of Search ............................... 296/37.1, 39.1, 296/39.2, 37.6, 37.16

[56] References Cited

U.S. PATENT DOCUMENTS

| | | | |
|---|---|---|---|
| 4,540,213 | 9/1985 | Herlitz et a. | 296/37.16 X |
| 5,080,418 | 1/1992 | Semple et al. | 296/39.2 |
| 5,083,827 | 1/1992 | Hollenbaugh, Sr. | 296/37.16 X |
| 5,110,171 | 5/1992 | Anthony | 296/39.2 |
| 5,167,433 | 12/1992 | Ryan | 296/37.1 |
| 5,167,434 | 12/1992 | Bott | 296/93.2 |
| 5,184,931 | 2/1993 | Safko | 296/39.2 |
| 5,441,183 | 8/1995 | Frenzel | 296/37.1 X |

FOREIGN PATENT DOCUMENTS

| | | | |
|---|---|---|---|
| 1246867 | 10/1960 | France | 296/39.2 |
| 3106116 | 12/1982 | Germany | 296/37.16 |
| 12478 | 1/1987 | Japan | 296/39.2 |
| 127141 | 5/1990 | Japan | 296/39.2 |
| 406199134 | 7/1994 | Japan | 296/136 |
| 2240755 | 8/1991 | United Kingdom | 296/39.1 |

*Primary Examiner*—Joseph D. Pape
*Attorney, Agent, or Firm*—Knechtel, Demeur & Samlan

[57] ABSTRACT

A sport utility vehicle cargo area liner is provided which is made of a flexible semi-rigid material such as ABS plastic. The liner has a bottom, two side walls each of which have at their uppermost edges near the wheel well a ledge which fits over the wheel well, and a leading edge and trailing edge. The leading and trailing edges are curved upwardly to allow the liner to easily slide over the sill of the sport utility vehicle cargo area and also to allow objects longer than the liner itself to be placed into the cargo area without the necessity of removing the liner or interfering with the vehicle seats. A stop strap system with a quick disconnect feature is provided to keep the liner safely in place yet it allows the quick removal of the liner. A harness is also provided to secure items in the liner.

7 Claims, 5 Drawing Sheets

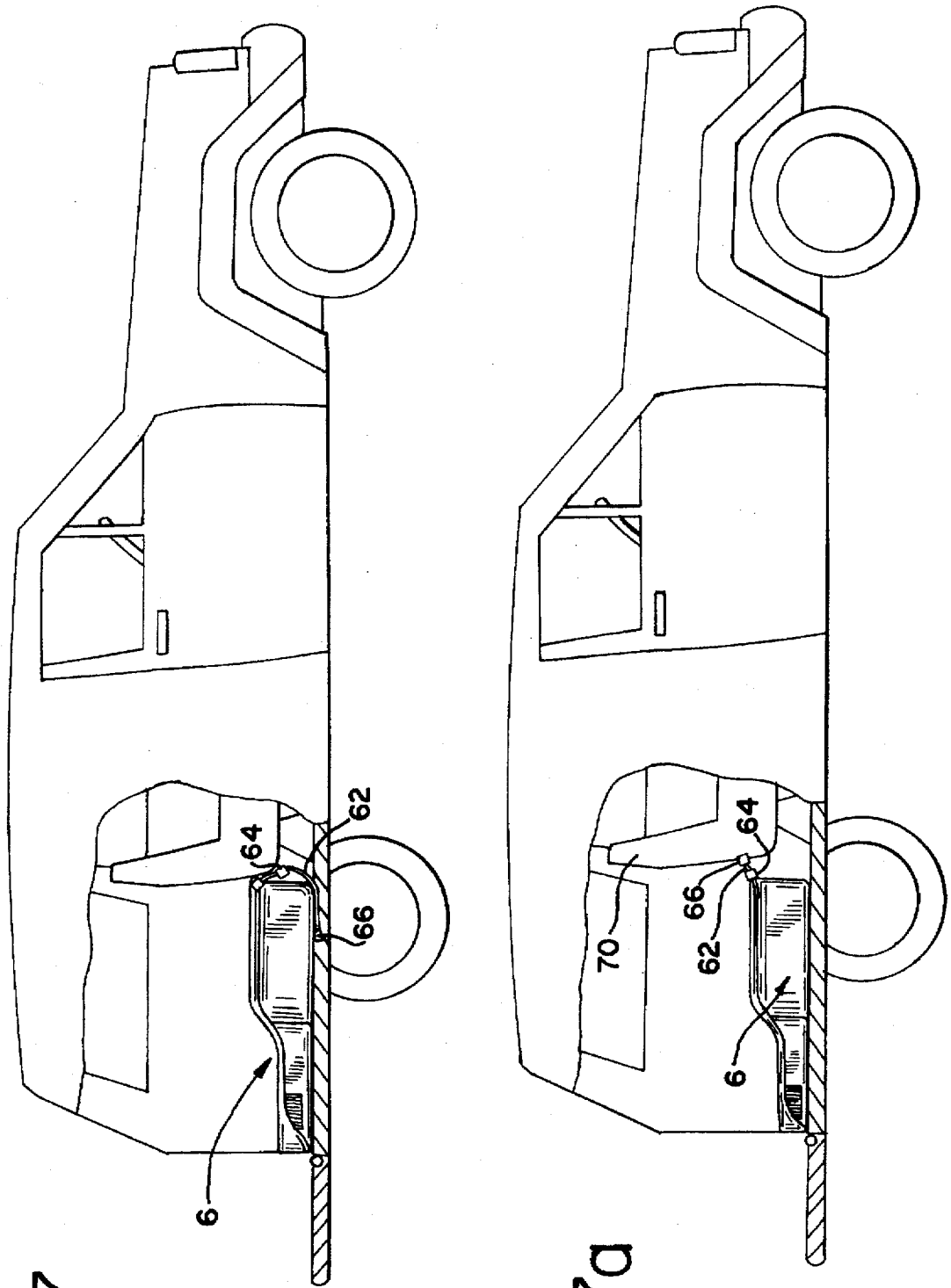

SPORT UTILITY VEHICLE CARGO AREA LINER

I. TECHNICAL FIELD

The present invention relates to vehicle storage area liners and more particularly to a cargo area liner for sport utility vehicles.

II. BACKGROUND OF INVENTION

Sport utility vehicles are popular with drivers. They offer car-like interiors and convenience combined with truck-like safety and load hauling capabilities. While the utilitarian features of a sport utility vehicle attract many purchasers, there are drawbacks to the cargo area. One drawback is that it is difficult to load so that the entire cargo area can be utilized; the front portion of the cargo area is out of the reach of most individuals. Utilizing the entire cargo area requires either climbing into the vehicle or bending over the tailgate or back edge of the vehicle. Doing so can soil clothing, cause back, leg and shoulder strain, and other difficulties. Unloading is difficult for the same reasons. If the full cargo area storage capabilities are used, climbing into the vehicle is required to unload the vehicle. Yet another drawback is that items being carried in the cargo area may break, causing spilling on the cargo area surface. Due to the size of the cargo area, it is difficult to clean such spills and, perhaps more importantly, the appearance and life of the vehicle interior are negatively effected.

III. PRIOR ART

Attempts have been made to address these problems. One solution is found in U.S. Pat. No. 5,167,433. This Patent discloses a device for use principally in car trunks but also discloses use in stationwagons and the like. A shortcoming of this device is that when used in a sport utility vehicle, the height causes anything being laid across its top to either hit the seats or ride in an unstable posture. Therefore, the device's integral front and rear walls do not allow for the hauling of long objects, such as wood, without removing the device from the vehicle. A further shortcoming of this device is that when used in a sport utility vehicle, it can slide dangerously about the cargo area as it has no securing features.

There is need, therefore, for a sport utility vehicle cargo area liner which easily slides into and out of the cargo area, is securable, makes it convenient to use the entire cargo area, protects the cargo area from damage, and allows for the safe and stable hauling of long objects without the necessity of removing the liner from the sport utility vehicle.

IV. OBJECTS OF THE INVENTION

An object of the present invention is to provide a sport utility vehicle cargo area liner.

Another object of the present invention is to provide a sport utility vehicle cargo liner which allows for convenient loading and unloading of the entire cargo area.

Another object of the present invention is to provide a sport utility vehicle cargo area liner which permits objects longer than the liner itself to be hauled in a sport utility vehicle in a stable posture and without the necessity of removing the liner or alter the seats of the vehicle.

Another object of the present invention is to provide a sport utility vehicle cargo area liner which slides easily into and out of a sport utility vehicle cargo area.

Another object of the present invention is to provide a sport utility vehicle cargo area liner which has a harness for securing transported items.

Another object of the present invention is to provide a sport utility vehicle cargo area liner which has a means for securing the liner into the cargo area.

V. SUMMARY OF THE INVENTION

The above objects and advantages are provided in a sport utility vehicle cargo area liner which is composed of a flexible, semi-rigid material such as plastic. The liner has a bottom and two sides, each of which have a ledge on the uppermost edge which is generally formed to the shape of the wheel well of the sport utility vehicle, and a leading edge and a trailing edge having at their outermost ends upwardly angled corners which meet the sidewalls and provide aesthetic value and additional strength. The leading and trailing edges of the sport utility vehicle cargo area liner allow the liner to easily slide over the sills of the vehicle cargo area and for the placement of objects longer than the liner itself across its top without the necessity of removing the liner or interfering with the seats of the sport utility vehicle. The underneath side of the bottom of the liner is smooth for easy sliding. A harness is provided for securing items in the liner. Finally, a securing system is provided to prevent the liner from moving excessively forward or rearward in the cargo area.

VI. BRIEF DESCRIPTION OF DRAWINGS

FIG. 7 depicts a side cut away view of a sport utility vehicle shown with the Device secured into the cargo area via the stop straps.

FIG. 7a depicts an alternate securing option using the stop straps.

VII. DETAILED DESCRIPTION OF THE PREFERRED EMBODIMENT

Figure 1:
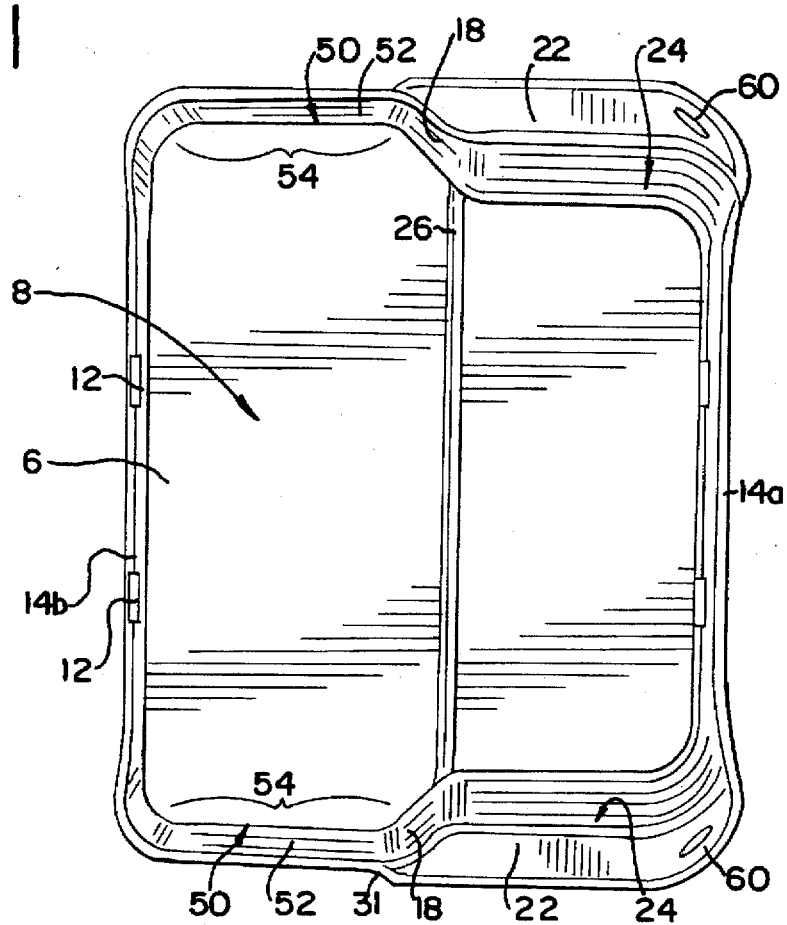
FIG. 1 is a top view of the Device.
Figure 2:
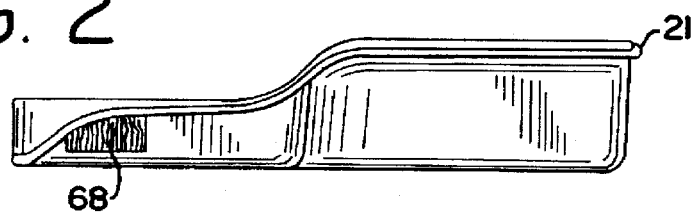
FIG. 2 is a side view of the Device.

Referring to FIG. 1, a sport utility vehicle cargo area liner (liner) 6 made of a light weight, flexible semi-rigid material such as Acrylonitrite-Butradiene-Styrene (ABS) plastic is shown. The liner can be made using any conventional molding process but is ideal for thermoforming. This process results in a high quality product and is the most efficient and cost effective method for doing so. The liner should be approximately 0.02 inches thick but the thickness can vary depending on the grade of plastic used.

The liner bottom 8 is essentially rectangular in shape but is molded at 18 to fit 18 around the wheel wells (not shown) 24 of a sport utility vehicle. Ideally, the bottom has a smooth underneath surface for easy sliding into and out of the sport utility vehicle. Due to the nature of the molding process, the top surface of the bottom is a hair cell texture, but a smooth surface is also contemplated. The length and width of the bottom should approximate the size and shape of the sport utility vehicle cargo area. Across the bottom 8 at approximately the midpoint from front to rear and extending from side-to-side is found a rib 26. The rib provides strength and support to the liner 6. The rib should be no taller than the leading edge 14a and trailing edge 14b so that it does not interfere with placing items longer than the liner into the cargo area.

Coformed to the bottom 8 opposite its side-to-side edges 50 are two upwardly extending side walls 52. The portion 54 of the side wall to the rear of the wheel well mold at 18 is lower in height than the wheel well of the sport utility vehicle. At the point the wheel well of the sport utility vehicle protrudes into the cargo area, the side wall increases in height at 34 to approximate that of the wheel well. At the uppermost edge of that portion of the side wall which covers the wheel well is a ledge 22 which fits approximately over the wheel well of the sport utility vehicle. The purpose of the ledge is two-fold: (1) it provides protection to the cargo area by covering the wheel well; and (2) it adds strength to the liner.

At the front end of the liner (that end which is nearest the front of the vehicle) is found a leading edge 14a and at the back end of the liner is found a trailing edge 14b. The leading edge is approximately 2.0 inches tall and the trailing edge approximately 1.5 inches tall. Ideally, the leading and trailing edges should be as low in height as possible so that objects which are longer than the liner itself can be easily slid into and out of the sport utility vehicle. The leading and trailing edges curve in an upwardly direction. This feature allows the liner to slide over the sill of the rear of the sport utility vehicle without hanging up.

Figure 6:
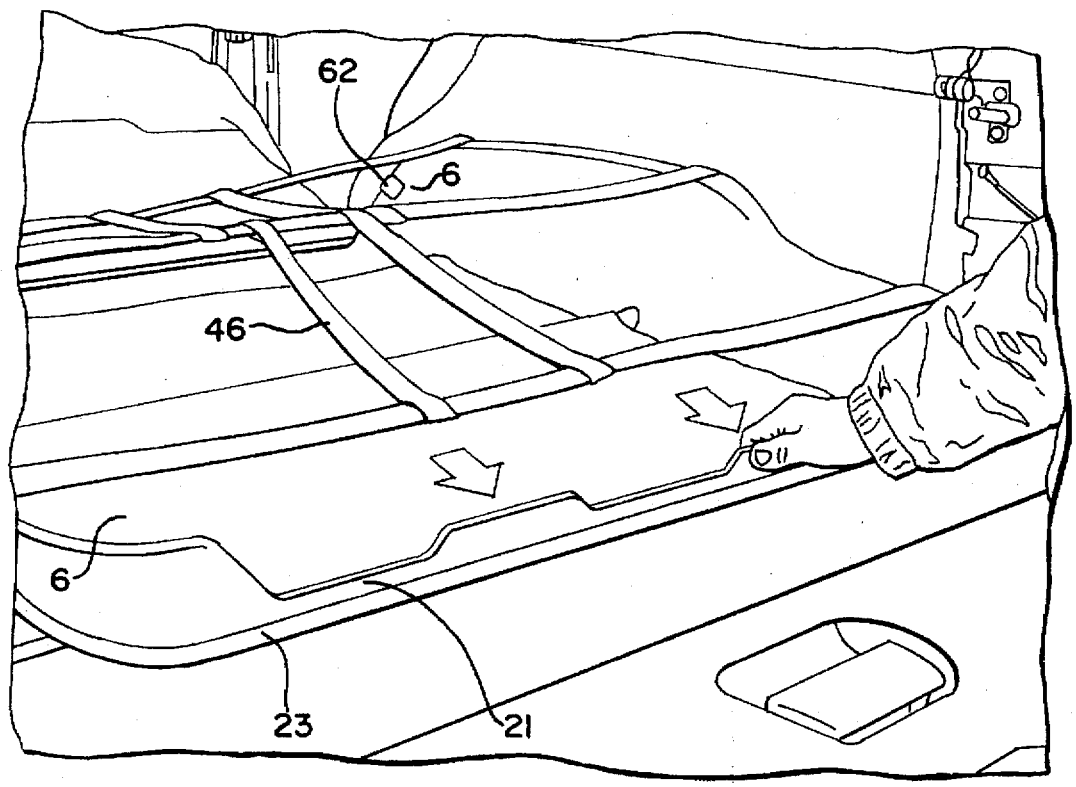
FIG. 6 depicts the rounded upper edge of the Device.

Referring to FIG. 6, it can be seen that the uppermost edge 21 of the liner is folded back upon itself in an outward direction, causing it to be rounded at its top. Trim Lok® 23, manufactured by Trim Lok, Inc. of Buena Park, Calif. is then installed onto the downwardly free projecting end of the rounded edge providing additional safety by covering the molded edge of the liner. Trim-lok® is a U-shaped plastic based material which is designed to fit over the free and often sharp edges of a plastic device. Covering the free edge of a plastic piece with Trim-lok® adds to the aesthetic value and increases safety. The inventors have found that with an unrounded upper edge, the Trim Lok® has a tendency to displace. By rounding the edge which then allows the Trim Lok® to be affixed in an upwardly manner, this problem is essentially eliminated.

Figure 3:
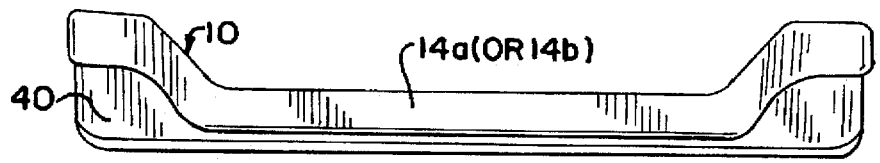
FIG. 3 is a head on view of the Device.

Turning to FIG. 3, it can be seen that at the outermost edges of the leading edge 14a and trailing edge 14b are generally triangular shaped corners 40 which rise from the edges starting approximately 3 inches from the end of each edge and rise at an approximate 45° 10 to meet the height of the side wall. The corners increase the aesthetic appearance of the liner and add strength to it. It is important that the angled corners do not begin to rise from the leading and trailing edges at a distance prior to the protrusion of the wheel well. This insures that items which are as wide as the wheel well-to-wheel well distance of the cargo area can be carried in the liner.

Along the length of the leading edge 14a and trailing edge 14b are found finger grips 12 which are used to slide the liner into and out of the sport utility vehicle. Any number of grips may be incorporated into the liner but the ideal number is two. In an alternate version of the liner, no grips are included; instead, the rounded upper edge of the leading and trailing edges is used as a grip.

FIG. 7 depicts a cut away side view of a sport utility vehicle showing the liner 6 placed in a sport utility vehicle and emphasizes a stop strap system 62. The stop strap system 62 secures the liner into place and prevents it from being pulled too far out of the cargo area and falling when the cargo liner is being loaded or unloaded. The stop strap system also prevents the liner from moving forward in the vehicle once the liner is in place. The stop strap system works in such a way that one end affixes to slots 60 in the ledge 22 of the liner 6, and the other end affixes to tie-downs 66 found within the floor of the sport utility vehicle cargo area. The stop straps have quick disconnects 64 for those times when the liner is removed from the cargo area.

Figure 7B:
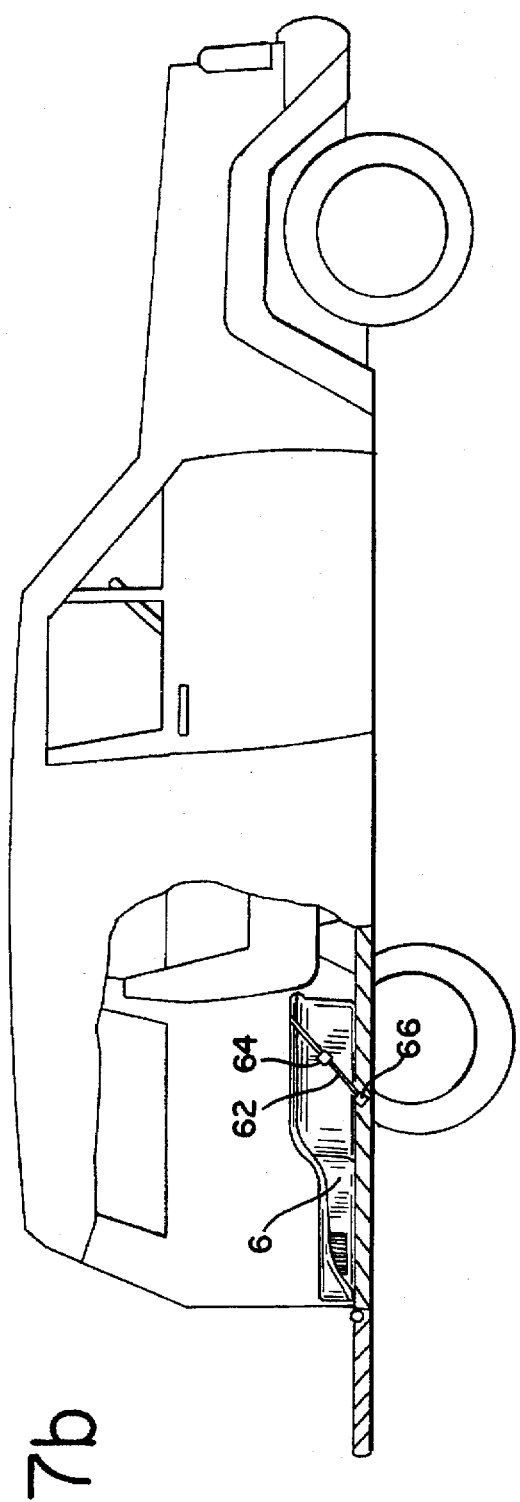
FIG. 7b depicts an alternate securing option using the stop straps.
Figure 7C:
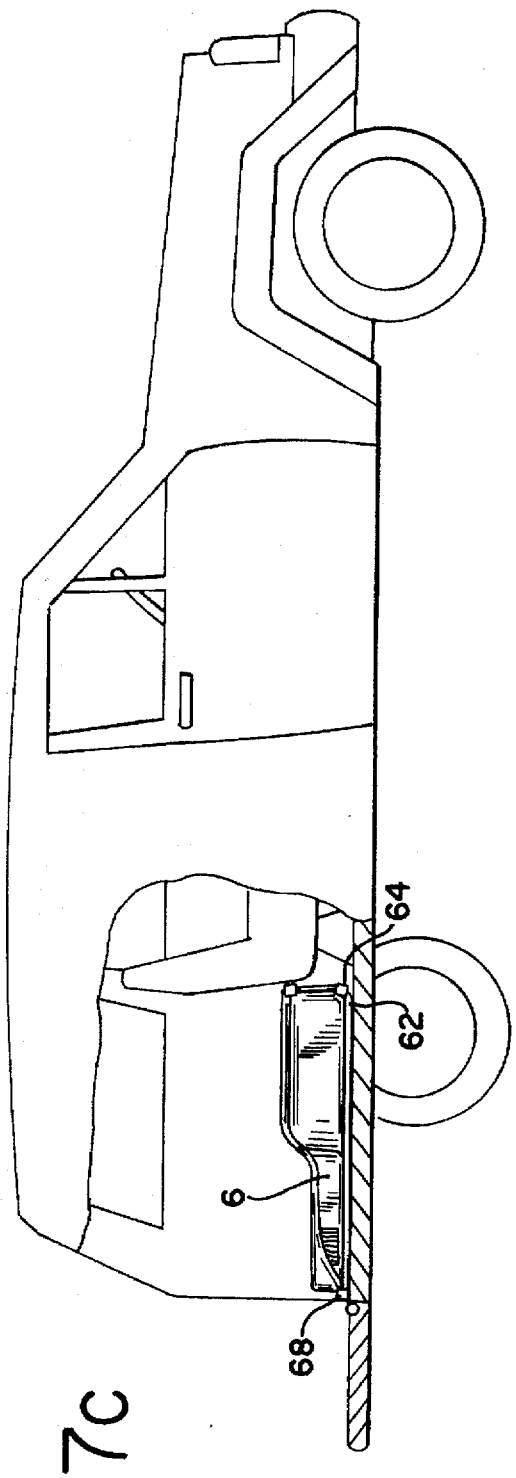
FIG. 7c depicts an alternate securing option using the stop straps.

Alternate systems for use of the stop strap system are depicted in FIGS. 7a through 7c. FIG. 7a depicts the stop strap system 62 attached from the slots 60 to the back of the rear seat 70. This configuration can be used in any vehicle but is ideal for those not having tie-downs. FIG. 7b depicts the stop strap system 62 attached to the slots 60 and extending along the side of the liner to tie downs found near the outer wall of the cargo area. In this application the stop strap system works on a pivot. FIG. 7c depicts a longer version of the stop strap system 62 which connects from the slots 60 to tailgate tie downs 68 of the sport utility vehicle.

The stop strap system 62 provides an added measure of safety in that if the rear seats are folded or removed, the stop strap system prevents the liner from moving forward in the vehicle such as during sudden stops or natural movement during driving. Likewise, when the liner is pulled out for loading or unloaded, or if children are playing in the back of the vehicle with the rear door open, the stop strap system prevents the liner from moving past the point in which it would normally fall out of a vehicle.

Figure 8:
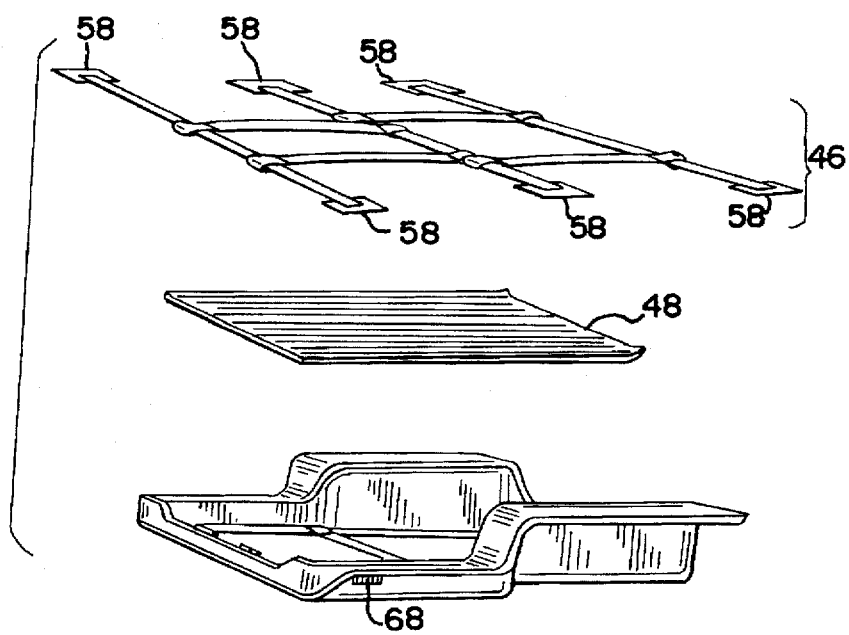
FIG. 8 depicts representative accessories for the Device (i.e. harness and non-skid mat).

FIG. 8 shows a cargo harness 46 which secures items into place. The harness 46 is infinitely adjustable both front to rear and side to side, by adjusting the harness straps to the desired length. The ends 58 of the harness are secured to the liner 6 by use of Velcro® 68 or other similar means. The harness can be secured over or around items transported in the liner. It is adjustable in length and in tension by use of adjustment means. Also, a mat 48 made of a non-skid material which can be easily placed into and removed from the liner for those times when limited movement of items in the liner is critical is provided.

Figure 4:
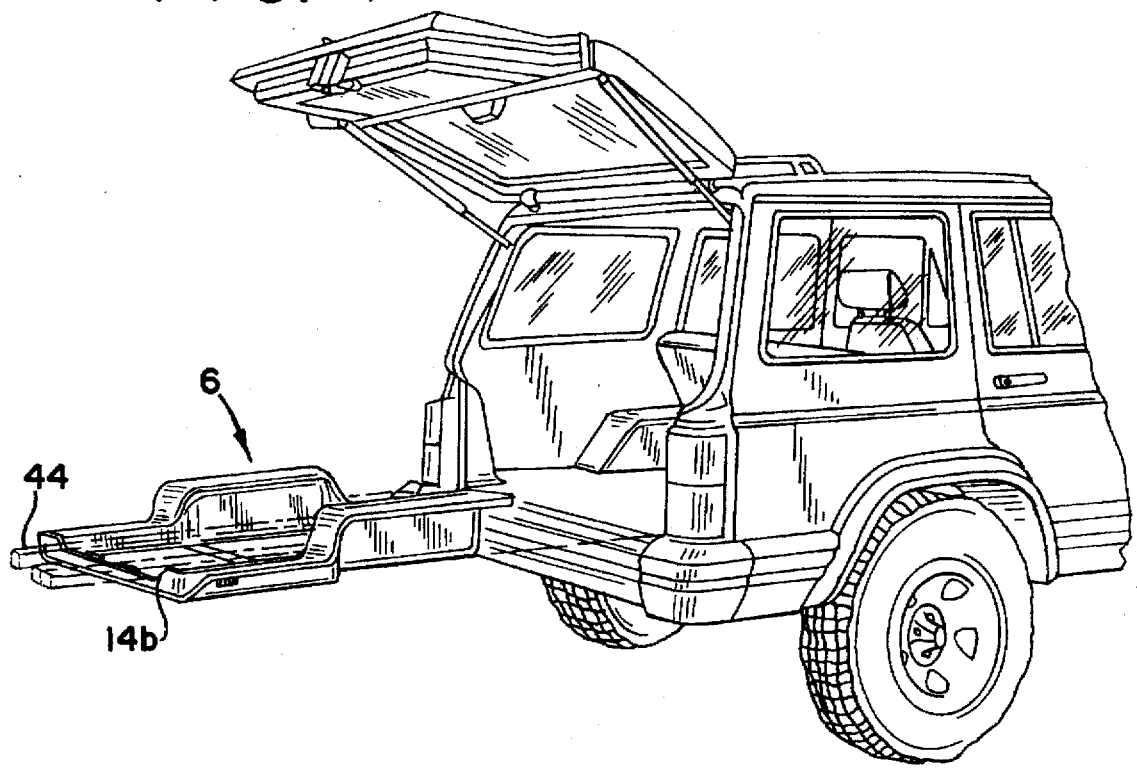
FIG. 4 depicts the Device being put into a sport utility vehicle and further shows an example of long objects (wood) resting on the Device.
Figure 5:
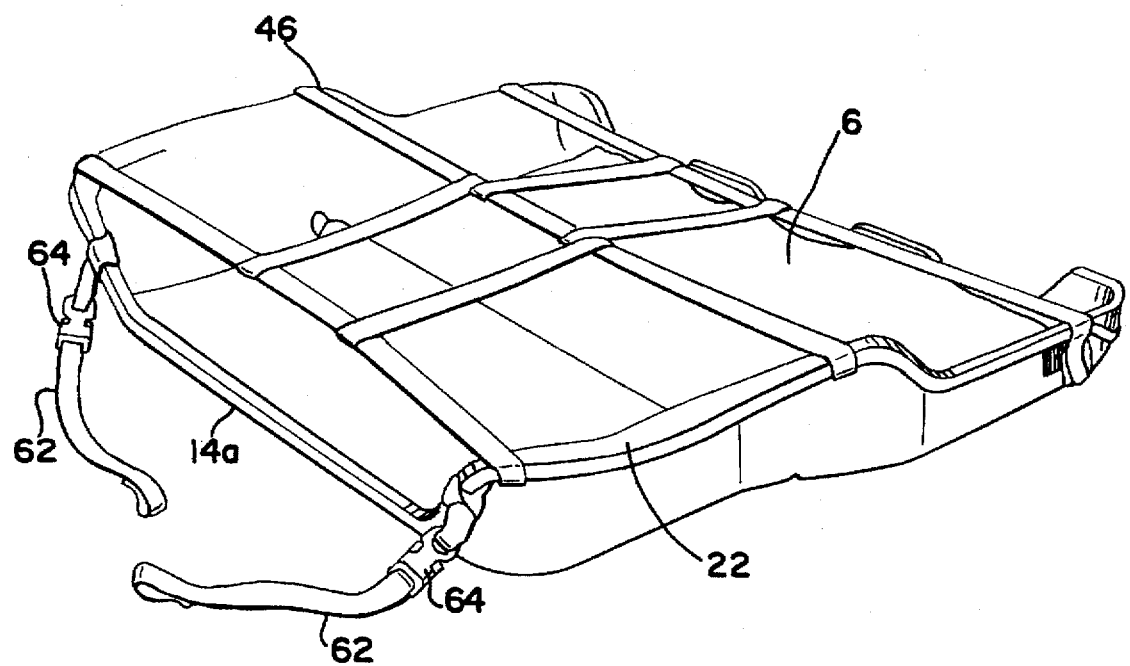
FIG. 5 depicts the Device with emphasis on the stop straps.

FIG. 4 shows that the liner is easily slid into the cargo area of a sport utility vehicle. For those times when the entire cargo area is not needed for hauling, items may be simply placed into the liner and, if required, secured in place with the harness 46. When the entire cargo area is required, the liner can be slid out the required distance, loaded, and slid back into the cargo area. Again, the harness may or may not be used, as desired.

For those times when items longer than the liner itself need to be hauled, such as wood 44, the items can lay across the leading edge 14a and trailing edge 14b of the liner and slide underneath the vehicle seats. For taller items, the rear seats of the vehicle can be folded or removed from the vehicle and the items can lay across the edges of the liner. Also, the liner may be partially slid out of the cargo area to assist in the loading or unloading of large items. Whether the seats are folded or removed or the liner is slipped partially out of the vehicle, the stop strap system 62 prevents the liner from moving excessively in to or out of the cargo area.

The liner 6 also prevents spilled items from soiling the interior of the cargo area. To clean spills, they may simply be wiped up or the liner can be removed for cleaning purposes.

The above presents the preferred embodiment of the invention; it is not to be limited by the above description but is to be determined by the appended claims.

We claim:

1. A liner for use in a sport utility cargo area, comprising:

A bottom being substantially rectangular in shape and having a front edge, a rear edge, and two side edges;

two side walls, one side wall protruding upward from each of the side edges of the bottom;

a leading edge co-formed to and protruding upward from the front edge of the bottom, and;

a trailing edge, co-formed to and protruding upward from the rear edge of the bottom, the trailing and leading edges each being of a height less than that of the sidewalls.

2. The liner of claim 1 wherein each of the sidewalls is molded to fit substantially around a sport utility vehicle cargo area wheel well, and each sidewall having an upper edge from which a horizontal ledge protrudes extending out toward the wheel well, covering at least a portion thereof.

3. The liner of claim 1 wherein the leading edge curves in a upward direction from the front edge of the bottom and the trailing edge curves in an upward direction from the rear edge of the bottom, the leading edge and trailing edge each having outermost ends along their horizontal length at which are found angled support means for providing structural strength, the angled support means extending downward from the upper edge of the side walls to the outermost edges of the leading edge.

4. The liner of claim 1 further having a plurality of slots in the leading edge, and securing means for securing the liner to the sport utility vehicle, the securing means having two ends, one end attaching to the slots in the leading edge and its opposite end attaching to attachment devices of the sport utility vehicle.

5. A liner for use in a sport utility vehicle cargo area comprising a:

bottom having a front edge, a back edge, and two side edges, two side wall, one side wall extending upwardly from each side edge of the bottom, a leading edge co-formed to the front edge of the bottom and a trailing edge co-formed to the back edge of the bottom, and securing means for securing the liner to the sport utility vehicle cargo area.

6. The liner of claim 5 wherein the leading edge and trailing edge have at their outermost edges an upward angling corner piece which rises to meet the height of the side walls.

7. A liner for use in a sport utility cargo area comprising: a bottom, two side walls which approximate the shape of a wheel well of a sport utility vehicle and further having a horizontal ledge which covers at least a portion of the wheel well, a leading edge and a trailing edge which are co-formed to the bottom and curve in an upwardly direction, and securing means for securing a liner to the sport utility vehicle cargo area.

* * * * *